No. 630,167. Patented Aug. 1, 1899.
M. G. BEAN.
POTATO DIGGER.
(Application filed Mar. 17, 1899.)
(No Model.) 2 Sheets—Sheet 1.
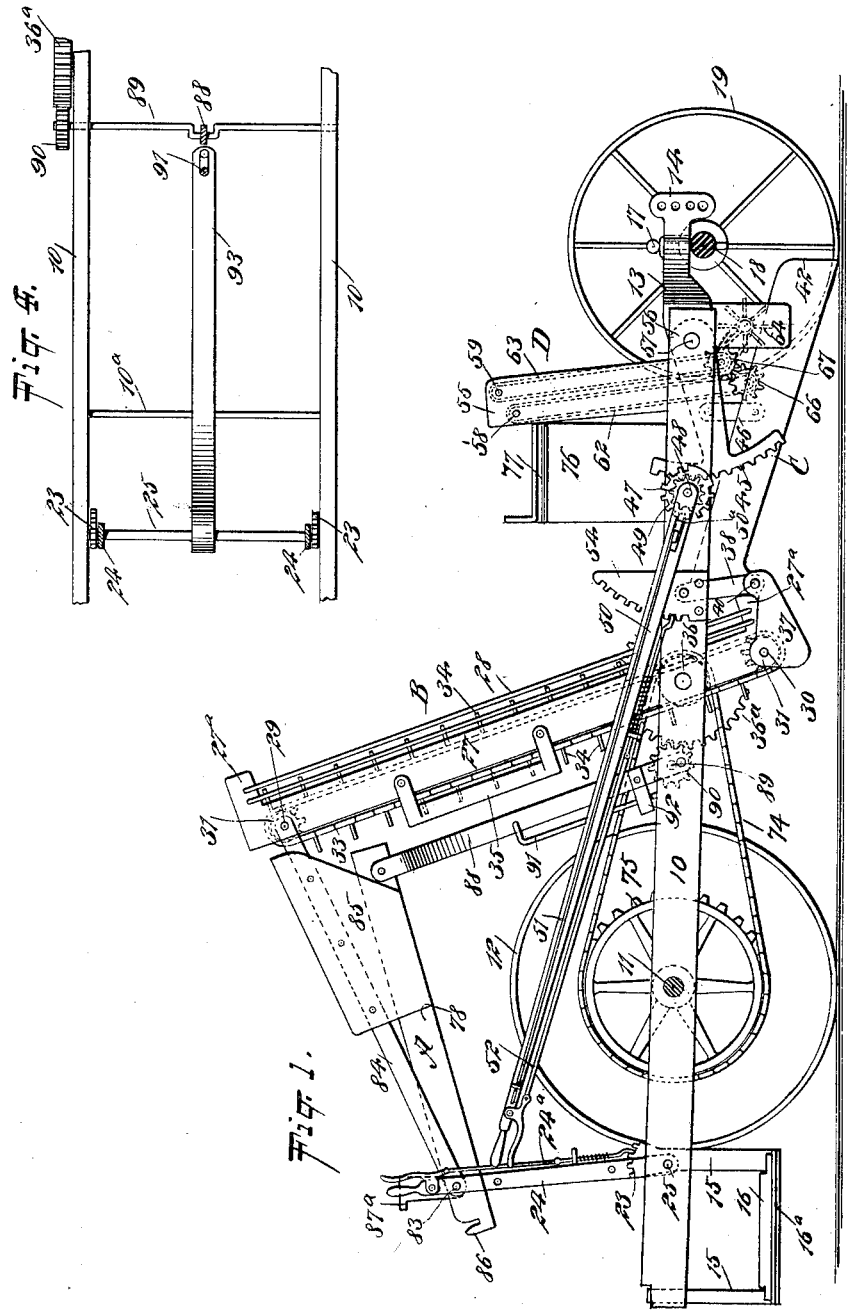
WITNESSES:
William P. Goebel
Fred Acker
INVENTOR
Mathias G. Bean
BY
ATTORNEYS.

No. 630,167.
M. G. BEAN.
POTATO DIGGER.
(Application filed Mar. 17, 1899.)
Patented Aug. 1, 1899.
(No Model.)
2 Sheets—Sheet 2.
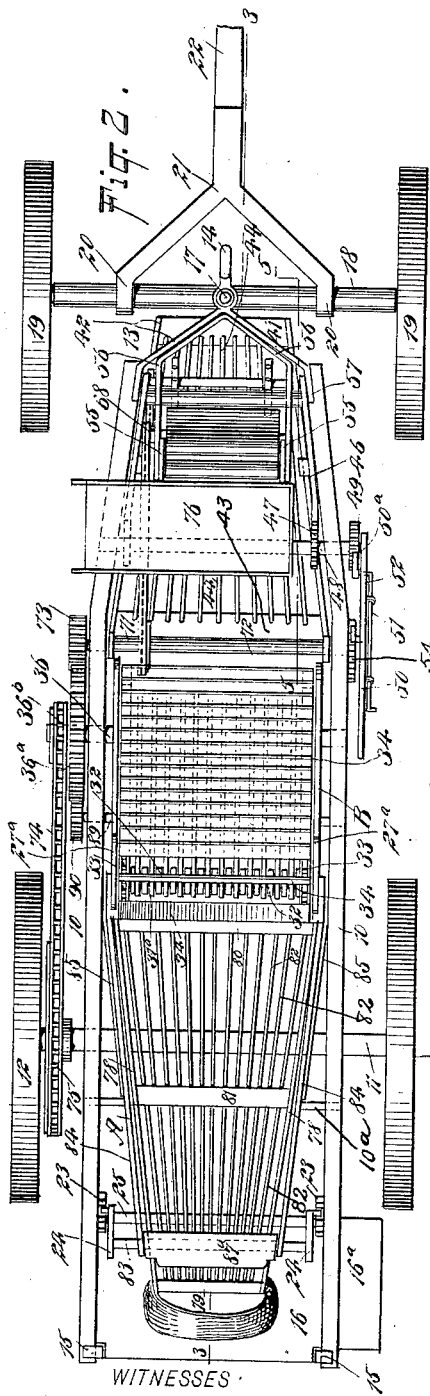
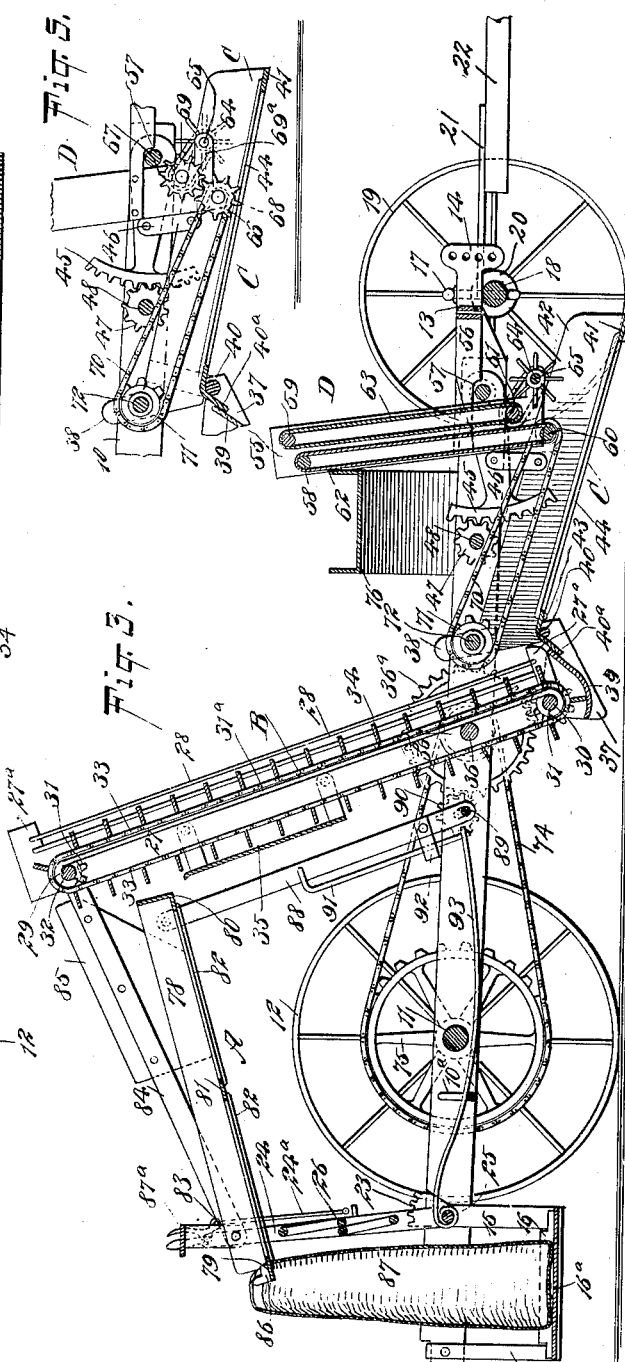
WITNESSES
William P. Goebel
Fred Acker
INVENTOR
Mathias G. Bean
BY
ATTORNEYS.

UNITED STATES PATENT OFFICE.

MATHIAS G. BEAN, OF RICE LAKE, WISCONSIN.

POTATO-DIGGER.

SPECIFICATION forming part of Letters Patent No. 630,167, dated August 1, 1899.

Application filed March 17, 1899. Serial No. 709,429. (No model.)

*To all whom it may concern:*

Be it known that I, MATHIAS G. BEAN, of Rice Lake, in the county of Barron and State of Wisconsin, have invented a new and Improved Potato-Digger, of which the following is a full, clear, and exact description.

The object of my invention is to provide a potato-digging machine adapted to be drawn by a team and which will be light and durable and capable of being operated by one person only if necessary.

A further object of the invention is to so construct the machine that the fork may be set to enter the ground to any desired depth or adjusted at will, whereby the potatoes, dirt, and vines will all be received upon the fork and separated at that point.

Another object of the invention is to provide a means for automatically carrying the vines to and discharging them at one side of the machine, returning the dirt in sifted condition to the ground, and finally feeding the potatoes to receptacles for convenience in transportation.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a view of the right-hand side of the machine. Fig. 2 is a plan view of the machine. Fig. 3 is a central vertical section taken practically on the line 3 3 of Fig. 2. Fig. 4 is a plan view of a portion of the frame of the machine and parts carried by the frame, other parts being in horizontal section; and Fig. 5 is a section through the digging-fork and driving and supporting shafts above it, the section being taken practically on the line 5 5 of Fig. 2 looking in direction of the left-hand side of the machine, the lower right-hand portion of the elevator for the tops or vines appearing also in elevation, as also portions of the driving-gear.

The frame of the machine consists of two side pieces 10, connected by suitable braces 10$^a$, and an axle 11 is journaled in the side pieces of the main frame near the rear, said axle being provided with supporting-wheels 12 at its ends. The forward portions of the side pieces of the main frame are connected by a horizontal yoke 13, preferably of angular construction, and from the central portion of this yoke 13 a clevis 14 is forwardly projected, while at the rear and each side face of the main frame a stirrup 15 is attached, extending in a downward direction. The stirrups serve to support a platform 16, upon which the operator stands, and a step 16$^a$ may be, and preferably is, formed at the right-hand end of said platform.

The forward end of the main frame may be wheel-supported, if desired, and when such support is employed a forward axle 18 is connected with the main frame through the medium of a king-bolt 17, that is passed through a portion of the clevis 14 and into and through the axle, as shown in Figs. 2 and 3. The axle 18 is provided at its ends with supporting-wheels 19 of less diameter than the rear supporting-wheels 12. The forward axle 18, when employed, is passed loosely through sleeves 20, attached to converging arms 21, said arms being secured to the pole or tongue 22, as illustrated in Fig. 2.

A rack 23 is secured to the upper end of the forward member of each stirrup 15, as is shown particularly in Fig. 1, and levers 24 are employed in connection with these racks, said levers 24 having thumb-latches 24$^a$, adapted for engagement with the racks, and the levers are fulcrumed upon a rod 25, that passes through the main frame, serving as a brace therefor. The levers 24 operate in unison, as they are connected by braces 26, as illustrated in Fig. 3. The levers are adapted to control the movement of a sifting or delivery chute A, connected with an elevator B, which latter receives the potatoes from the digging-fork C, the relative arrangement of these parts being clearly shown in said Fig. 3.

The elevator B consists of two side pieces 27, each of which is provided at the top and bottom with a forward extension 27$^a$, and bars or wires 28 are carried from one extension 27$^a$ to the other, as shown in Fig. 3. These bars virtually constitute side guards for the carrier of the elevator. A shaft 29 is journaled in the upper portion of the sides of the elevator-frame, and a second shaft 30 is journaled in the lower portion of the sides of the elevator-frame, as illustrated in Fig. 3. Each shaft 29 and 30 is provided near each end between the sides of the elevator-frame with a sprocket-wheel 31. (Shown in Fig. 3 and both being shown in dotted lines in Fig. 1.) The back of the elevator-frame consists of a series of rods 31ª, that extend loosely around the shafts 29 and 30, being spaced by washers 32, as shown in Fig. 2. Thus the back of the elevator-frame is in the nature of a sieve. A chain belt 33 is passed over corresponding upper and lower sprocket-wheels 31 on the shafts 29 and 30, and blades or slats 34 are secured to said belts, extending transversely of the elevator-frame and from one of the side guards 28 to the other.

A shield 35 is located at the rear of the elevator-frame and extends such a distance from the frame as not to interfere with the downward passage of the blades or slats 34 of the carrier. The elevator B is pivoted in the main frame by passing a shaft 36 through the sides of the elevator and through the beams 10 of the main frame, as shown in Figs. 1, 2, and 3. This pivot-shaft 36 carries a driving-gear 36ª at its left-hand end and a sprocket-wheel 36ᵇ, as shown best in Fig. 2. An angle-plate 37 is pivoted at the lower end of each side piece of the elevator, and these angle-plates 37 constitute the side pieces for a boot, which comprises, in addition to the side plates or pieces 37, a bottom plate 39. (Shown best in Fig. 3.) The side plates 37 are upwardly and forwardly curved in direction of the digging-fork C and are pivotally connected at their forward ends with the side pieces of the main frame by means of links 38. A rod 40 is made to extend from the forward end of one side piece 37 of the boot to the opposing side piece of said boot, and said rod serves as a support for the rear end of the digging-fork C. The rear end of the fork is provided with a projection 40ª, that is carried over said rod and downward in engagement with the bottom portion of the elevator-boot, as is also shown in Fig. 3, so that the digging-fork may be raised and lowered without danger of the potatoes passing rearward from the digging-fork and escaping the blades or slats 34 of the elevator-carrier. The rear end of the digging-fork is directly pivoted on the rod 40 through the medium of the links 38, secured to the sides of the fork, the rod 40 passing through the lower ends of said links, as shown in Fig. 1.

As heretofore stated, the digging-fork is in the nature of a scoop, consisting of a front blade 41, having its upper face concaved and its forward edge sharpened, side pieces 42, that are secured to said blade, a rear transverse bar 43, and tines 44, that extend from the cutting-blade 41 to the rear blade 43, said tines being placed in such relation to each other that the dirt from the potatoes dug will sift through the spaces between them; but said spaces are not sufficiently large to permit the passage of even a small potato.

The digging-fork C is raised and lowered by the following mechanism: A segment 45 is pivoted to the inner face of each side bar 10 of the main frame at a point between the center and forward end of said fork, as shown in Fig. 3, and the shanks of said segments, through the medium of which said segments are pivoted, are connected with the sides of the digging-fork through the medium of links 46, as is shown in Figs. 1 and 3. These segments are toothed and their teeth are adapted to mesh with pinions 47, secured upon a shaft 48, said shaft being journaled in the side pieces of the main frame. The shaft 48 is provided at its right-hand end with a gear 49, as shown best in Fig. 1, and a lever 50 is likewise pivoted upon the right-hand end of the shaft 48, said lever being provided with a dog 50ª, attached to a rod 51, and said rod where it is connected with the dog passes through a slot in the lever 50. The rod 51 extends upward to a point near the handle end of the lever, as shown in Fig. 1.

A thumb-latch 52 is carried by the lever 50, and at its lower end is adapted to engage with a rack 54, secured to the right-hand side beam of the main frame of the machine. Thus by raising and lowering the lever 50 the digging-fork may be raised or lowered and no matter what position the regulating-lever 50 may occupy said position may be changed to increase or decrease the throw of the digging-fork C by disengaging the dog 50ª from the gear 49 and carrying the lever downward or upward along the teeth of the rack 54.

An elevator D for the vines is employed in connection with the digging-fork. This elevator is located above the fork near the end that enters the ground, and said vine-elevator D consists of side pieces 55, having a forwardly-projecting bow 56, adapted to fit into the bow 13, connecting the forward ends of the side pieces of the main frame, as shown in Fig. 2. The bow extension of the sides of the vine-elevator is pivoted or fulcrumed upon a rod 57, that extends from side to side of the main frame at the front, serving also as a brace for said main frame. Two rollers 58 and 59 are journaled in the upper ends of the sides of the frame of the elevator D, the forward roller 59 having a much greater elevation than the rear roller 58, and two corresponding rollers 60 and 61 are journaled in the sides of said elevator D, near the bottom of its sides, the rear roller 60 being lower than the forward roller 61. An endless carrier-belt 62 is passed over the upper roller 58 and the lower corresponding roller 60, and a similar belt 63 is passed over the upper roller 59 and the lower forward roller 61. The two belts are brought quite close together and the vines are fed to the space between the belts through the medium of spur-wheels 64, secured upon a shaft 65, the shaft being journaled in forward extensions from the bottom of the side pieces of said vine-elevator D, as is clearly shown in Fig. 3.

At the right-hand trunnion of the lower roller 60 a pinion 66 is secured, arranged to mesh with a pinion 67 at the right-hand end of the trunnion of the forward lower roller 61, as is shown in Fig. 5. On the left-hand trunnion of the lower rear roller 60 a sprocket-wheel 68 is secured, (shown in dotted lines in Fig. 5,) and a similar sprocket-wheel 69 (shown in dotted lines in Fig. 5) is secured to the left-hand trunnion of the front roller 61. A chain belt 70 is passed over the left-hand sprocket-wheel 68 at the bottom of the vine-elevator frame and over a sprocket-wheel 71, attached to a shaft 72, journaled in the main frame, and at its left-hand end this shaft is provided with a pinion 73, meshing with the driving-wheel 36ª, as shown in Fig. 2. Thus it will be observed that the lower rear roller of the vine-elevator is driven by the belt 70 and that at the right-hand side of the frame of said elevator motion is communicated to the second or forward lower roller through the meshing pinions 66 and 67. The shaft carrying the spur-wheels 64 is revolved by a chain belt 69ª, carried over the sprocket-wheel 69 at the lower left-hand side of said elevator D and a suitable sprocket located on the spur-wheel shaft 65.

The driving-gear 36ª is driven by a chain belt 74, which is passed over a large sprocket-wheel 75, secured upon the axle 11, as shown in Fig. 2. A chute 76 is supported by a rearwardly-extending arm 77 at the upper rear portion of the vine-elevator D. In the operation of this portion of the device potatoes, earth, and vines are received upon the digging-fork C. The vines are then directed by the spur-wheels 64 to the space between the carriers 62 and 63 of the vine-elevator, and said vines are thence carried upward to the chute 76 and are delivered by said chute at the left-hand side of the machine free from the frame. The earth taken up with the potatoes drops downward from the fork through the spaces between its tines, while the potatoes on the fork, being pushed rearward by the potatoes entering at the blade end of the fork, will be received by the blades of the main elevator B and will be carried upward by said blades and dropped into the main delivery-chute A, heretofore referred to. This main delivery-chute A consists of two sides 78, a rear cross-bar 79, a front cross-bar 80, preferably an intermediate cross-bar 81, and tines 82, that extend from the intermediate cross-bar respectively to the front and rear cross-bars, as shown in Fig. 3.

The rear end of the main delivery-chute A is fulcrumed upon a rod or bar 83, that extends through the sides of the chute at a proper distance above the bottom and is connected at its ends to the rear levers 24. Arms 84 are pivoted upon the rod or fulcrum-bar 83, and these arms are carried forward and are pivotally attached to the upper side portions of the main elevator B. Shields 85 are provided at the forward ends of said arms and extend downward at the sides of said main delivery-chute, as shown in Figs. 1 and 3. The rear cross-bar of the main delivery-chute extends beyond its sides, and said rear cross-bar is provided at each end with upwardly-extending prongs or spurs 86, adapted to receive the upper portion of a bag 87, the bottom of the bag being made to rest, preferably, on the platform 16 at the rear lower portion of the main frame, as shown best in Fig. 3.

A drop-slide 87ª is provided for the rear end of the main delivery-chute, so that when a bag 87 is removed therefrom the flow of potatoes from the chute may be stopped until another bag can be placed in position. The main or delivery chute A is adapted to have a vertical movement at its front end, so that any dirt that may pass up with the potatoes received by said chute will be shaken out through the spaces between the tined bottom of said chute. To this end a pitman 88, having a forked upper end, is attached at said upper end to the sides of the main or delivery chute A at its forward portion, and the lower end of said pitman 88 is pivotally attached to a crank-arm formed upon a shaft 89, as shown in Fig. 4, said shaft being journaled in the sides of the main frame, and this shaft 89 is provided at its left-hand end with a pinion 90, that meshes with the driving-wheel 36ª. A rod 91 is attached to said pitman, extending from a point near its center downward along its rear edge to a point near the bottom, said rod 91 being passed through a suitable guide 92. The lower end of said rod is made to enter an opening in the forward end of a spring 93, curved in an upward direction. Said spring between its ends rests in a stirrup formed upon a brace-rod 10ª near the rear end of the main frame, while the rear end of said spring 93 is carried around the rod 25, upon which the rear levers 24 are fulcrumed.

The main elevator B and the main delivery-chute A may be given a decided rearward inclination by disengaging the thumb-latches 24ª of the rear levers 24 from their racks 23, and when the main elevator B is thus inclined rearward the digging-fork will be projected farther forward than usual. When the machine is in operation, the main elevator is preferably given this decided rearward inclination; but when the machine is to be driven from the field the main elevator may be restored to practically an upright position by the forward movement of the rear or shifting levers 24, the spring 93 assisting in the forward movement of said elevator, as said spring 93 is placed under tension when the main elevator is inclined rearwardly.

In the operation of the complete machine, the digging-fork having been adjusted to enter the ground, the machine is driven along the ridge in which the potatoes have been planted. The digging-fork will unearth the potatoes as the machine advances, and the potatoes, with the dirt and vines, will pass rearwardly over said fork. The dirt will sift down between the tines of the fork, and the vines will be taken up by the spur-wheels 64 and conducted by the forward elevator D and its chute 76 to one side of the machine, while the potatoes will be taken by the main elevator B and delivered upon the tines of the main delivery-chute A, which chute is vertically reciprocated while the machine is in motion. The potatoes, freed from any dirt that may cling to them after leaving the main elevator, will be directed to the bags or other receptacles adapted to receive them and suspended from the rear end of the main delivery chute.

Having thus described my invention, I claim as new and desire to secure by Letters Patent—

1. In a potato-digger, a fork having a sieve-bottom, the fork being adapted to receive potatoes, earth and vines, an elevator supported above said fork, said elevator consisting of parallel carrier-belts, one belt extending below the other at both top and bottom, a shaft located at the bottom portion of the elevator, and spur-wheels carried by the shaft, being adapted to conduct vines to the space between the carrier-belts of the elevator, for the purpose described.

2. In a potato-digger, a fork having a sieve-bottom, the fork being adapted to receive potatoes, earth and vines, an elevator supported above said fork, the elevator consisting of parallel carrier-belts, one belt extending below the other at both top and bottom, a shaft located at the bottom portion of the elevator, spur-wheels carried by the shaft, being adapted to conduct vines to the space between the carrier-belts of the elevator, a wheeled support for the said fork, a driving connection between the axle of the wheel-support and the rollers of the elevator carrier-belts, and a driving connection between the rollers of said carrier-belts and the shaft carrying said spur-wheels, for the purpose specified.

3. In a potato-digger, a fork having a screen bottom, an elevator located above said fork and adapted to receive the vines, a feed device arranged to conduct the vines from the fork to said elevator, a second elevator located at the rear of said fork, and arranged to receive the potatoes therefrom, and a driving mechanism for both elevators and feed device, the said feed mechanism being driven by the movement of the machine.

4. In a potato-digger, a fork having a sieve bottom, means for raising and lowering the fork, a vine-elevator located above the fork, a feed device for the vine-elevator, a second elevator adapted to receive potatoes and located at the rear of said fork, and a reciprocating chute arranged to receive material from the second or main elevator, as set forth.

5. In a potato-digger, a fork having a sieve bottom, means for raising and lowering the fork, a vine-elevator located above the fork, a feed device for the vine-elevator, a second elevator adapted to receive potatoes and located at the rear of said fork, a reciprocating chute arranged to receive material from the second or main elevator, levers for adjusting the main or rear elevator and the delivery-chute, the delivery-chute being provided with a screen bottom, and a pivoted stop located at the delivery end of said delivery-chute, for the purpose specified.

6. In a potato-digger, the combination, with a digging-fork of scoop-like construction, comprising sides, a front cutting-blade, a rear connecting-blade, and tines connecting the cutting-blade and rear connecting-blade, and means for raising and lowering said fork, of an elevator supported above said fork, said elevator consisting of a frame, parallel belts located within the frame, means for driving said belts, one being lower than the other at both the top and bottom ends, a shaft supported by the elevator-frame, means for driving said shaft, and spur-wheels carried by said shaft, the spur-wheels being located opposite the space between the two belts at their lower ends, said spur-wheels being adapted to conduct vines from said fork to said space between the belts, as set forth.

7. In a potato-digger, the combination, with a scoop-like digging-fork having its bottom formed of tines and its forward edge sharpened, an elevator supported above said fork, adapted to receive vines, a feed device arranged to conduct vines from said fork to said elevator, and means for raising and lowering said fork, of a pivoted main elevator located at the rear of said fork, being adapted to receive potatoes therefrom, a delivery-chute located at the rear of the main elevator, and arranged to receive potatoes from said main elevator, said delivery-chute having its bottom constructed of tines, a pivoted support for the rear end of said delivery-chute, a rocking support for the forward end of the delivery-chute, and levers for adjusting the position of the delivery-chute and main elevator, as described.

8. In a vegetable-digger, the combination with a supporting-frame and the digging devices, of a chute mounted on the frame, a driven crank-shaft mounted on the frame, a pitman connecting the chute with the shaft, a rod attached to the pitman, and a spring mounted on the frame and connected with said rod.

MATHIAS G. BEAN.

Witnesses:
F. B. KINSLEY,
C. E. DORLAND.